United States Patent [19]

Mevel et al.

[11] 3,736,384

[45] May 29, 1973

[54] MULTIPLE CONNECTION DEVICE FOR A TELEPHONE UNIT

[75] Inventors: Yves Mevel, Gilocourt par Orrouy, Yves Renaudin, Montigny-les-Cormeilles, both of France

[73] Assignee: Societe Francais Des Telephones Ericsson, Colombes, Hauts-de-Seine, France

[22] Filed: Dec. 6, 1971

[21] Appl. No.: 205,097

[30] Foreign Application Priority Data

Dec. 8, 1970 France....................7044184

[52] U.S. Cl.....................179/18 GE
[51] Int. Cl.....................H04q 3/42
[58] Field of Search....................179/18 GE

[56] References Cited

UNITED STATES PATENTS

| | | | |
|---|---|---|---|
| 3,519,754 | 7/1970 | Schluter | 179/18 GE |
| 3,423,537 | 1/1969 | Schluter | 189/18 GE |
| 3,349,187 | 10/1967 | Bray | 179/18 GE |

*Primary Examiner*—Kathleen H. Claffy
*Assistant Examiner*—Kenneth D. Baugh
*Attorney*—Karl W. Flocks

[57] ABSTRACT

Device for multiple connection of a primary telephone unit to at least two secondary units by means of relay type selectors namely intended to respectively interconnect primary and secondary wires of a telephone exchange, comprising a relay in said primary unit and a main line to which the inputs of said secondary units are parallel-connected, said inputs being connected to a line fed with a positive potential controlling said secondary units, said primary unit further comprising a contact connected to another positive potential intended to fed said main line when a second secondary unit is connected to said primary element without disconnecting an already connected secondary unit.

4 Claims, 3 Drawing Figures

MULTIPLE CONNECTION DEVICE FOR A TELEPHONE UNIT

The present invention relates to a device applicable in the telephony art and provides novel operating facilities for rod relay-type miniselectors, which system was described in French Pat. No. 69, 24, 398 of July 17,1969.

Miniselectors permit of building up telephone switching trunks that provide metallic interconnections between input units of the trunk and output units through a variety of paths.

Although prior art metallic selectors perform the same operations, their slowness is ill-suited to modern applications, particularly in the design of electronically controlled exchanges.

It is customary in telephony to connect a given input unit (unit No.1 in FIG. 1) to a plurality of output units (units Nos.2 and 3 in FIG. 1). This operation is referred to as a channel switch or Y-connection and consists in establishing the link between unit No.1 and unit No.2 and thereafter the link between unit No.1 and unit No.3 without disrupting the former link. Either of the two links can be broken independently afterwards.

The subject device of this invention allows of simply and advantageously accomplishing such multiple connections for a telephone unit (already accomplished in conventional electromechanical trunks), more particularly in a trunk system utilizing a rod relay-type miniselector, by means of simple equipment and without adjustment of the component used.

A device of this kind considerably extends the performance of such a miniselector since the multiple switching operations are widely used and are of great utility in telephone systems. It enables a unit to be connected to at least two other units by means of relay selectors.

In accordance with this invention, application of a positive potential to a main line on which the relays are parallel-connected will maintain all the previously energized relays in their operative positions irrespective of the perturbation caused by the operating of the other (or of another) relay, whereby the connection between the first unit and one of the other units remains established while the connection between said first unit and the other (or another) unit is in turn established.

The first unit includes a relay which is series-connected to the main line on which the relays of the other units are parallel-connected.

Application of the positive potential is controlled by the first-unit relay.

The description which follows with reference to the accompanying non-limitative exemplary drawings will give a clear understanding of how the invention can be carried into practice.

Horizontal or primary wires *a*, *b* can be connected to vertical or secondary wires a, b through the contacts *a*1, *b*1, through the contacts *a*2, *b*2, or through other similar contacts *an*, *bn*.

A switching operation is effected by causing one of a number of identical relays R2, R3, etc. to assume its operative position and to be maintained therein. A relay R1 belonging to unit No.1 must be maintained in its operative position through the duration of a telephone link.

To interconnect unit No.1 with unit No.2, relay R2 must be operated, for example, while relay R3 will interconnect unit No.1 with unit No.3, for example.

The relays and their corresponding contacts operated by said relays are as follows:

Relay $R_1$ operates contact $r_1$;

Relay $R_2$ operates contacts $a_1$, $b_1$, $c_1$; and

Relay $R_3$ operates contacts $a_2$, $b_2$, $c_2$.

Figure 2:
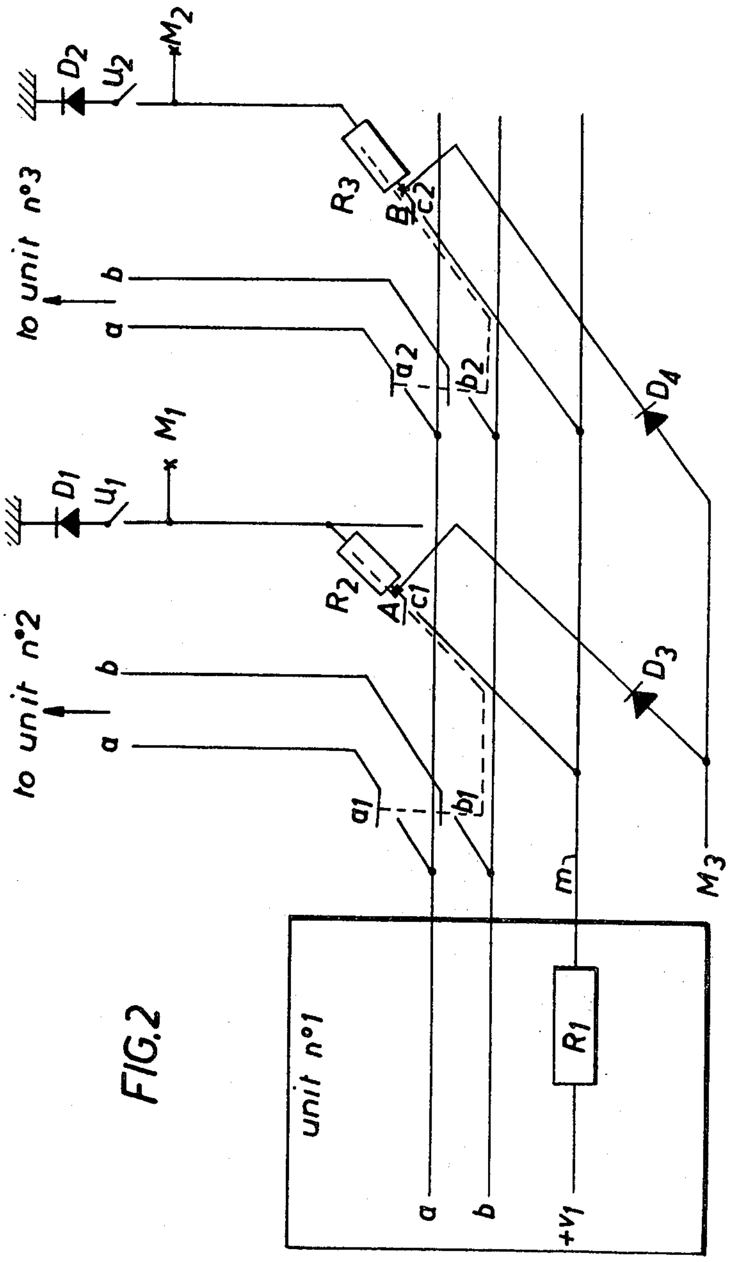
FIG. 2 shows part of the selector elements required by the invention.

Establishment of link between unit No.1 and unit No.2-(FIG. 2)

A potential (OV) is applied at M3 and a potential (−V2) is applied simultaneously at M1. Relay R2 is the only one to simultaneously receive a difference in potential on its operative terminals. Diodes D3, D4 and others, occupying the same position, prevent parasitic currents from flowing to other relays.

Contact C1 of relay R2 operates and a current flow is established through relays R1, R2 (+V1, relay R1, wire *m*, contact C1, relay R2, potential −V2 at M1). Simultaneously, another operation causes contact $u_1$ to be established.

Diode D1 is blocked since its cathode potential (OV) is higher than its anode potential (−V2).

When the potentials applied at M1, M3 are removed,relays R1, R2 can hold in their operative positions (current flow: +V1, R1, wire *m*, C1, relay R2, $u_1$, diode D1, earth).

Operations identical to the above enable the operating of other selectors. Contacts similar to *al; bl;* controlled by relays similar to R2, establish electrical flow continuity between unit No. 1 and unit No.2.

Figure 1:
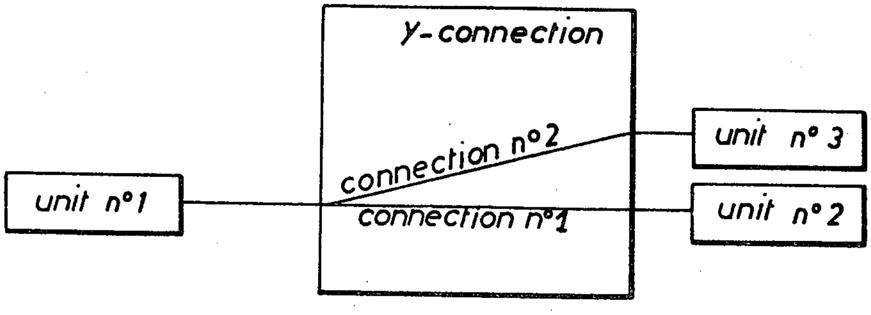
FIG.1 PRIOR ART
FIG. 1 is a diagram showing the connection form known in telephony as a Y-connection.
Figure 3:
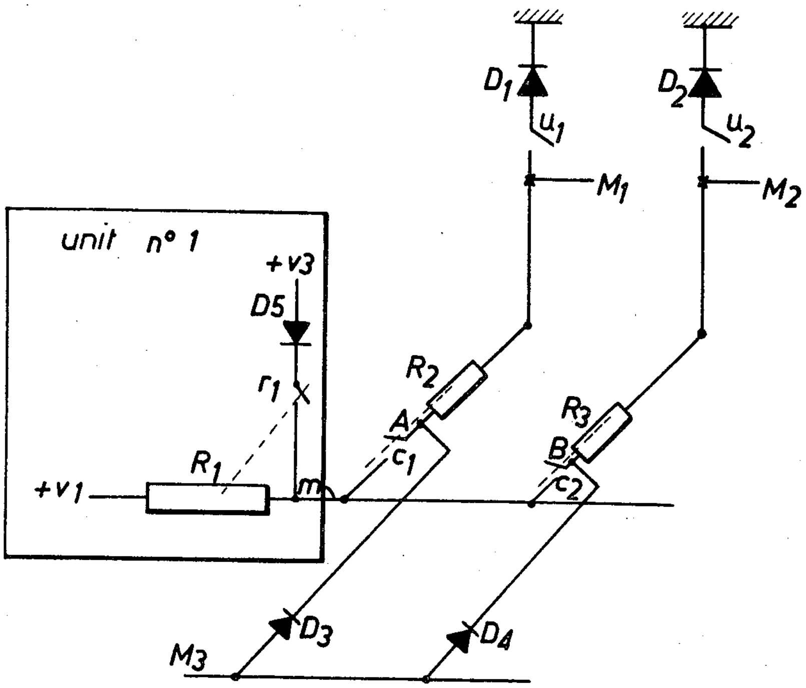
FIG. 3 shows an embodiment of an arrangement according to this invention.

Establishment of link between unit No.1 and unit No.3-(FIG. 3)

Application of a potential (OV) at M3 and (−V2) at M2 causes relay R3 to operate in the same way as described precedingly in respect of relay R2, but a secondary effect of this operation would cause relay R2 to drop out: the potential (OV) applied at M3 is applied to the point B. When contact C2 closes this potential propagates along wire *m;* since contact C1 is closed, the point A is at the same potential as the point B, i.e. close to potential OV (the voltage drop in D4 being small); since the potential of point M1 is also close to potential OV (contact $u_1$ closed, diode D1), relay R2, being no longer energized, would drop out.

One way of preventing this would be to use relays R2, R3, —having much shorter closing times than drop-out times. Thus, the application times and magnitudes of the potentials (OV) at M3 and (−V2) at M2 would be chosen large enough to cause R3 to operate yet low enough to leave R2 in its operative position. This method, however, would require delicate adjustment of R2, R3, — and very close operating tolerances.

In accordance with the present invention, a potential (+V3) is applicable to wire *m* via a diode D5 and a contact r1 of relay R1.

When relay R2 is in its closed position, the potential of wire *m* is positive. V3 has a value permitting blocking of diode D5 in this state, thereby preventing flow of V3 during the period of time of the connection of unit No.1.

In causing relay R2 to operate, relay R1 was tripped in, and thereafter the diode D5 and the (+V3) potential source will prevent a substantial drop in the potential of wire *m* below the potential V3. When relay R3 is caused to operate, the unwanted dropping out of relay R2 consequently no longer occurs. Diode D5, in its conducting state, energizes two circuits in parallel:

C1, R2, $u_1$, earth

C2, R3, $u_2$, D2, and earth, when steady-state conditions are established.

Relay R2 is thus adequately energized during the R3 operating period by the potential V3. Against this advantage,however, the system prevents energization of relay R1 with a potential substantially higher than V1 – V3, which would in turn substantially retard operation of relay R1. This drawback is avoided by inserting the contact r1 in series with the diode D5.

A judicious choice of the potential V3 and of the relays R1, R2 will ensure that the potential V3 is delivered only for the minimum time, which is the marking time. An example of an operative embodiment would use the following voltage values:

$+V_1 = +12V$ $-V_2 = -12V$ $+V_3 = +5V$

Furthermore, the coils of relays $R_1$, $R_2$ and $R_3$ have equal resistance values. When relay $R_2$ operates, a + 6V voltage is established at node A; diode $D_5$ is therefore blocked and source $V_3$ does not feed. When relay $R_3$ is in operation, contact $c_2$ is closed and thus the voltage at node A decreases but not under 5V since diode $D_5$ becomes conducting and $V_3$ is feeding. During the period of time necessary to allow $R_3$ to operate, $R_2$ is fed by $V_3$.

Thus, the potential at node A is never under value $V_3$: relay $R_1$ would never be fed with a voltage greater than $V_1$–$V_3$, i.e. 7V, which is very low. In order to overcome this drawback, contact $r_1$ is added. This contact is open when $R_1$ does not operate. The voltage at node A may then decrease under 5V which allows $R_1$ to operate.

The above-disclosed arrangement further allows of setting up other links between the unit 1 and other units.

The simplicity and reliability of the subject device of this invention, coupled with the complete absence of adjustments or close tolerances on its component parts,make it particularly economical and advantageous.

It goes without saying that changes and substitutions of parts may be made in the specific embodiment hereinbefore described, without departing from the scope of the invention as set forth in the apended claims.

We claim:

1. A device for multiple connection of a primary telephone unit to at least two secondary units by means of relay type selectors, more particularly for connecting secondary wires to primary wires of a telephone installation, comprising:

a relay in said primary unit, connected between a first positive supply voltage and a main line to which the inputs of said secondary units are parallel-connected through first contacts;

a secondary line connected to a second positive voltage and to which the inputs of said secondary units are likewise parallel-connected, on the side of said first contacts opposed to said main line, through a first diode;

at least one secondary unit formed by a relay the input of which is connected to said main line through said first contacts and to said secondary line and the output of which is connected in series with a negative-voltage application point, a second contact, a second diode, and earth;

means included in said primary unit for energizing said main line with a third positive voltage when a second secondary unit is becoming connected and a first secondary unit has already been connected to said primary unit.

2. A device as claimed in claim 1, wherein said first contact is part of said secondary-unit relay, the latter being capable of being maintained in its operative position when said second positive voltage and said negative voltage cease to be applied, by current flow between said first voltage, said main line,said second contact and earth.

3. A device as claimed in claim 1, wherein the means included in said primary unit include a third contact connected between said main line and said third positive voltage, by way of a third diode, said third contact forming part of said primary-unit relay,whereby said third positive voltage is applied to said inputs of said secondary units during the time taken to connect a second secondary unit when a first secondary unit has already been connected, without causing disconnection of the latter.

4. A device as claimed in claim 1, wherein each of said first contacts is intended for connecting a secondary line of a telephone installation to a primary line thereof.

* * * * *